(12) United States Patent
Koehler

(10) Patent No.: US 8,794,580 B1
(45) Date of Patent: Aug. 5, 2014

(54) ADJUSTABLE MOUNTING BRACKET

(75) Inventor: Michael O. Koehler, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 295 days.

(21) Appl. No.: 13/373,745

(22) Filed: Nov. 10, 2011

(51) Int. Cl.
*E04G 3/00* (2006.01)

(52) U.S. Cl.
USPC ............ 248/284.1; 248/70; 248/73; 248/421; 248/166; 248/286.1; 248/316.1

(58) Field of Classification Search
USPC .......... 248/70, 73, 157, 421, 166, 207, 274.1, 248/284.1, 286.1, 287.1, 315, 316.1, 354.5, 248/288.11, 291.1, 296.1; 403/289, 290, 403/344
See application file for complete search history.

(56) References Cited

U.S. PATENT DOCUMENTS

| | | | | |
|---|---|---|---|---|
| 2,074,586 A | * | 3/1937 | Heinrich et al. | 182/113 |
| 2,375,513 A | * | 5/1945 | Bach | 248/59 |
| 2,947,506 A | * | 8/1960 | Slutzky | 248/123.11 |
| 3,292,886 A | * | 12/1966 | Rovinsky | 248/49 |
| 3,473,202 A | * | 10/1969 | Howard | 403/344 |
| 4,032,103 A | * | 6/1977 | Ehrichs | 248/421 |
| 4,119,285 A | * | 10/1978 | Bisping et al. | 248/72 |
| 4,428,697 A | * | 1/1984 | Ruland | 403/344 |
| 4,609,171 A | * | 9/1986 | Matsui | 248/74.3 |
| 4,676,472 A | * | 6/1987 | Kamrud, Sr. | 248/542 |
| 4,682,750 A | * | 7/1987 | Rudolph et al. | 108/145 |
| 5,996,961 A | * | 12/1999 | Johnson | 248/669 |
| 7,261,256 B2 | * | 8/2007 | Pattie et al. | 244/129.1 |
| 7,264,215 B2 | * | 9/2007 | Niehoff | 248/371 |
| 7,608,782 B2 | * | 10/2009 | Hill | 174/84 C |
| 7,637,468 B2 | * | 12/2009 | Huang | 248/421 |
| 2010/0189502 A1 | * | 7/2010 | Basta et al. | 405/3 |
| 2010/0272383 A1 | * | 10/2010 | Mock | 384/585 |
| 2010/0325797 A1 | * | 12/2010 | Horne | 5/611 |
| 2011/0108681 A1 | * | 5/2011 | McKenzie-McHarg | 248/70 |

* cited by examiner

*Primary Examiner* — Terrell McKinnon
*Assistant Examiner* — Michael McDuffie
(74) *Attorney, Agent, or Firm* — Gerhard W. Thielman, Esq.

(57) ABSTRACT

A bracket is provided for mounting conduit clamps or pipe clamps to the face of the bracket. The height of the bracket can be adjusted by removing pins that are attached to mounting bracket feet and mounting bracket arms. Multiple holes may be formed in the mounting bracket arm and mounting bracket feet to allow for various alignments of the bracket arms, which will vary the height of the bracket. The height is adjusted through a pair of four-bar linkages that enable a linear motion of the bracket face. The bracket may have a footprint that is smaller than conventional adjustable mounting brackets.

7 Claims, 7 Drawing Sheets

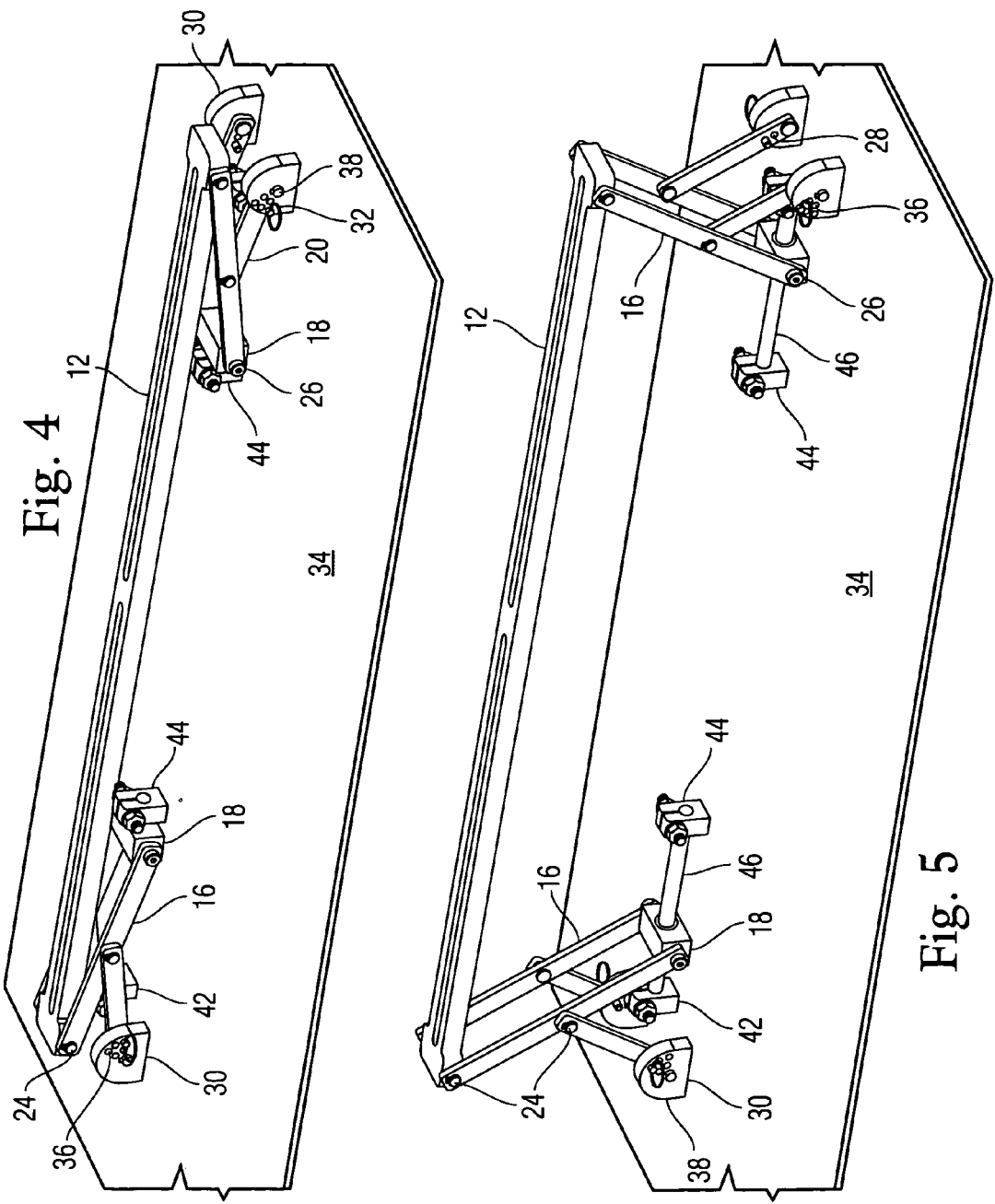

ADJUSTABLE MOUNTING BRACKET

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates to mounting brackets and, more particularly, mounting brackets for mounting pipe or conduit clamps that is adjustable in height with a minimal footprint.

A conduit which houses electrical wires or cables is generally supported over the length of its run on a support surface such as an electric pole, a building, or other structure. The conduit is generally supported in a parallel spaced arrangement on the support surface by a clamping device.

Most conventional height adjustable brackets utilize either a swinging arm mechanism or a linear slide to adjust the bracket. Both require a large footprint for the bracket. There is a need for an amounting bracket for mounting pipe or conduit clamps that is adjustable in height with a minimal footprint.

SUMMARY

Conventional mounting brackets yield disadvantages addressed by various exemplary embodiments of the present invention. In particular, various exemplary embodiments provide an adjustable mounting bracket comprises a bracket face having a height that is adjustable relative to a mounting surface; a long bracing bracket having a first long bracing bracket end pivotably attached to each end of the bracket face; a short bracing bracket having a first short bracing bracket end pivotably attached to a central region of the long bracing bracket; and one or more holes at a second short bracing bracket end, the one or more holes adapted to permit the short bracing bracket to pivot about the second short bracing bracket end, the one or more holes further adapted to fix the position of the short bracing bracket on a bracket mount.

According to another aspect in the exemplary embodiments, an adjustable mounting bracket comprises a bracket face having a height that is adjustable relative to a mounting surface; a long bracing bracket having a first long bracing bracket end pivotably attached to each end of the bracket face; a bearing block pivotably attached to a second long bracing bracket end; a bearing sleeve disposed in a hole through the bearing block; a bearing travel bar disposed to permit travel of the bearing block there along when the height of the bracket face is adjusted; a short bracing bracket having a first short bracing bracket end pivotably attached to a central region of the long bracing bracket; one or more holes at a second short bracing bracket end, the one or more holes adapted to permit the short bracing bracket to pivot about the second short bracing bracket end, the one or more holes further adapted to fix the position of the short bracing bracket on a bracket mount.

According to a further aspect in the exemplary embodiments, a method for adjustably securing one or more tubular members to a bracket comprises attaching at least one clamp onto a bracket face; adjusting the height of the bracket face; and securing the one or more tubular members to the at least one clamp, wherein the bracket comprises a bracket face having a height that is adjustable relative to a mounting surface; a long bracing bracket having a first long bracing bracket end pivotably attached to each end of the bracket face; a short bracing bracket having a first short bracing bracket end pivotably attached to a central region of the long bracing bracket; and one or more holes at a second short bracing bracket end, the one or more holes adapted to permit the short bracing bracket to pivot about the second short bracing bracket end, the one or more holes further adapted to fix the position of the short bracing bracket on a bracket mount.

The above and other features described for exemplary embodiments, including various novel details of construction and combinations of parts, will now be more particularly described with reference to the accompanying drawings and pointed out in the claims. The particular assembly in these embodiments is shown by way of illustration only and not as a limitation to the claims. The principles and features of this invention may be employed in various and numerous embodiments without departing from the scope of the invention.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 4 is a perspective view of the adjustable mounting bracket attached to a surface and adjusted to a low height;

FIG. 5 is a perspective view of the adjustable mounting bracket attached to a surface and adjusted to a high height;

DETAILED DESCRIPTION

Figure 1:
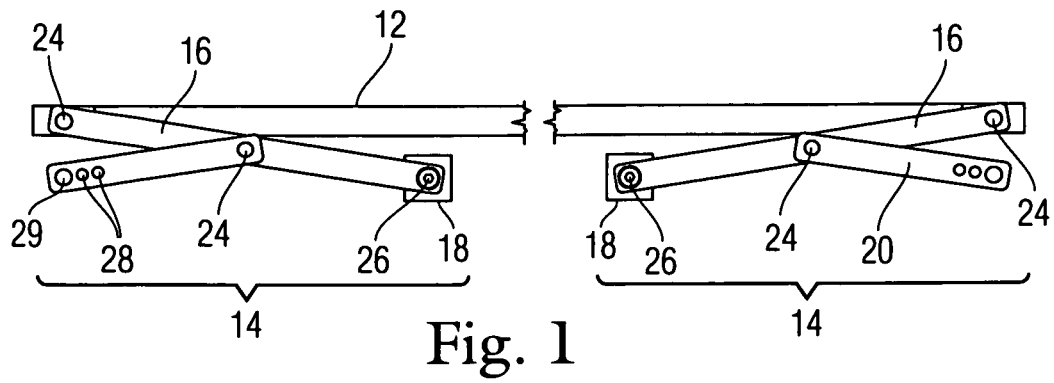
FIG. 1 is an elevation view of an adjustable mounting bracket according to an exemplary embodiment.
Figure 2:
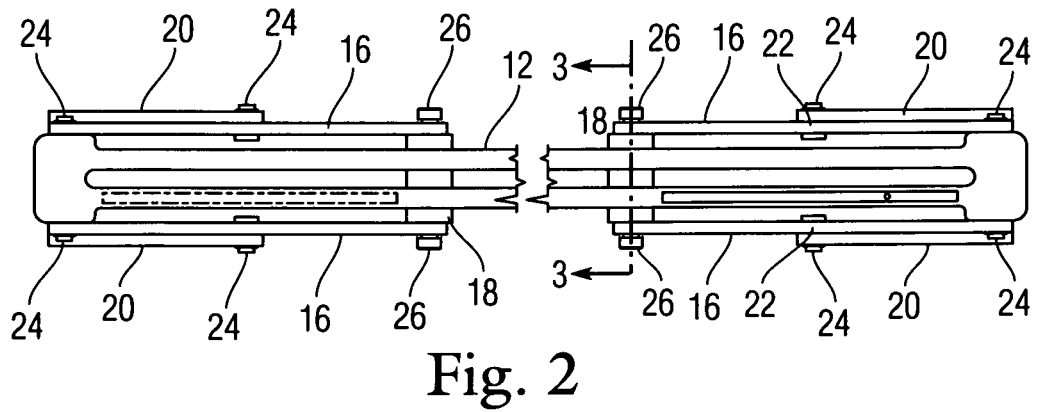
FIG. 2 is a plan view of the adjustable mounting bracket.
Figure 3:
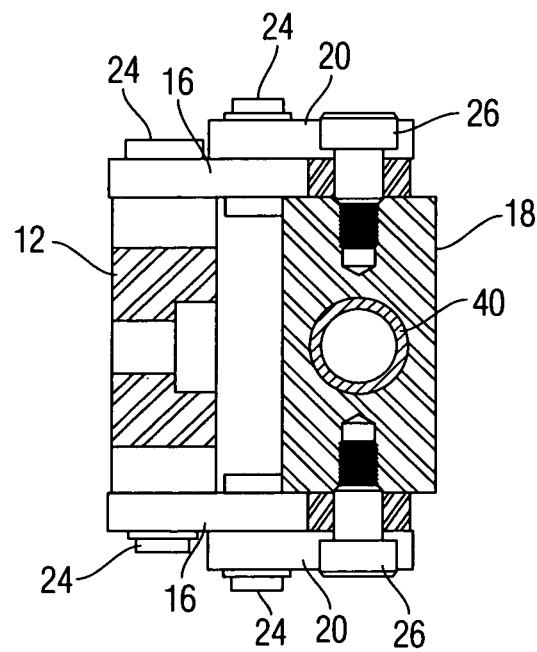
FIG. 3 is a cross-sectional view taken along line 3-3.
Figure 6:
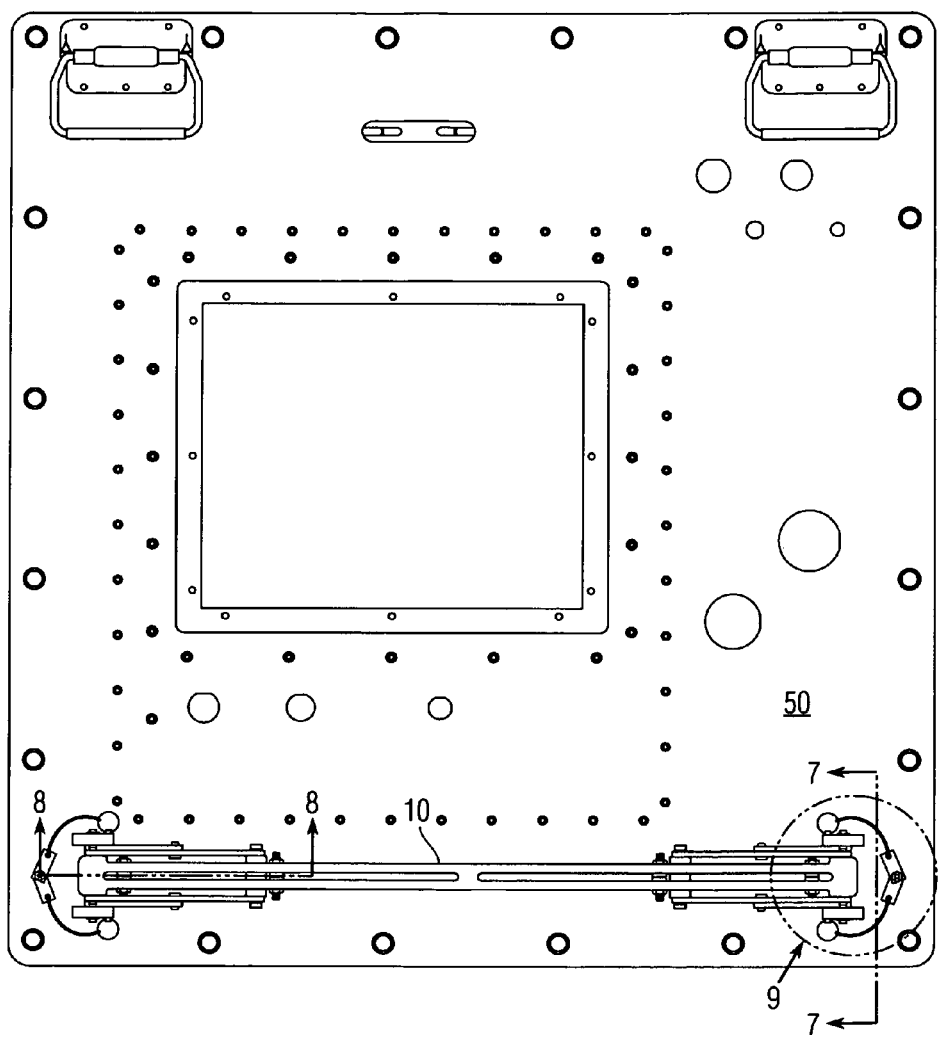
FIG. 6 is an elevation view of a panel sub-assembly using the adjustable mounting bracket.
Figure 7:
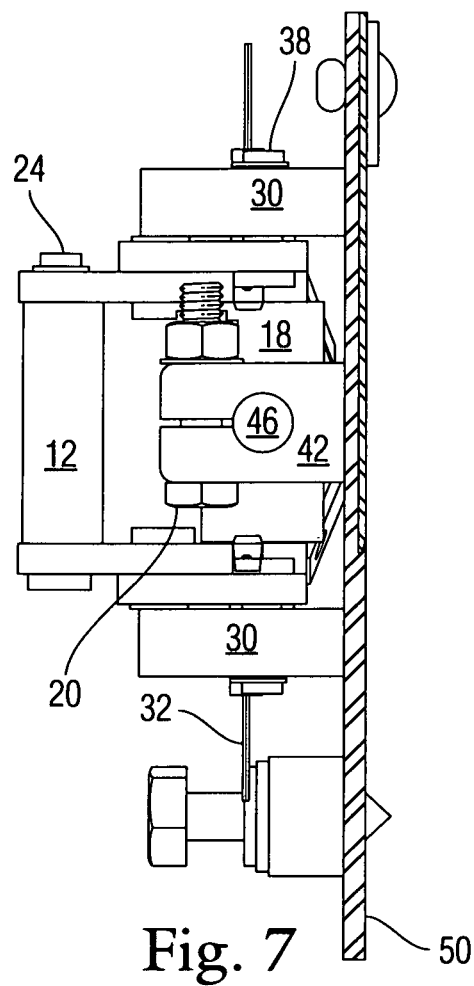
FIG. 7 is a cross-sectional elevation view taken along line 7-7.
Figure 9:
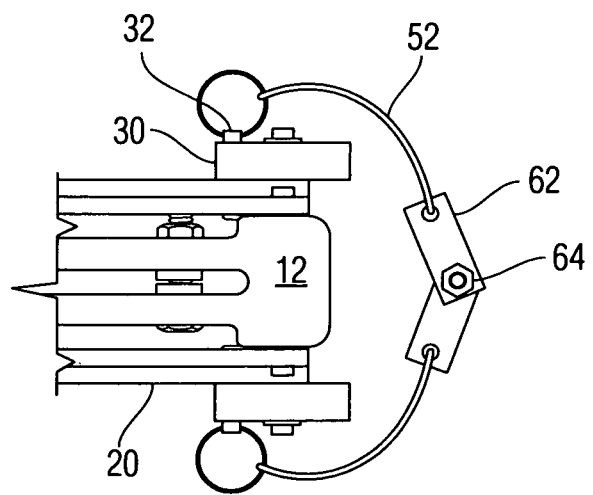
FIG. 9 is a detail plan view of section 9.
Figure 8:
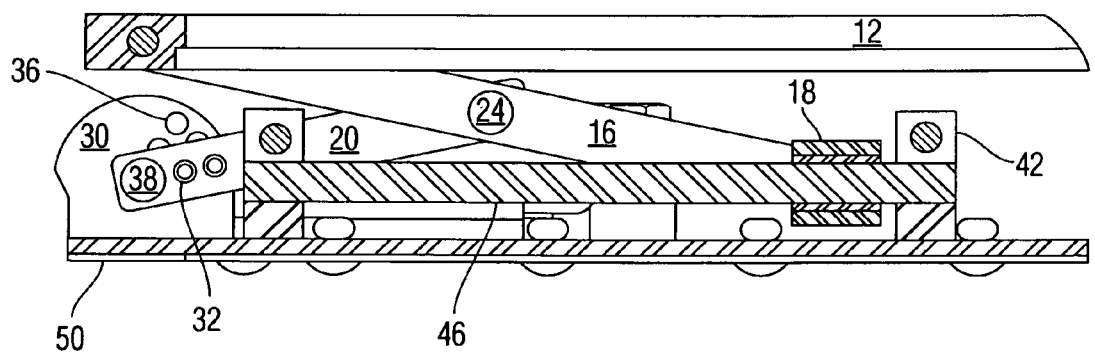
FIG. 8 is a cross-sectional elevation view taken along line 8-8.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention.

Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Broadly, the current invention provides a bracket that permits the mounting of conduit clamps or pipe clamps to the face of the bracket. The height of the bracket can be adjusted by removing pins that are attached to mounting bracket feet and mounting bracket arms.

Multiple holes may be formed in the mounting bracket arm and mounting bracket feet to allow for various alignments of the bracket arms, which will vary the height of the bracket. The height is adjusted through two four-bar linkages that allow for a linear motion of the bracket face. The bracket of the current invention may have a footprint that is smaller than conventional adjustable mounting brackets.

Referring now to the drawings, and more particularly to FIGS. 1 through 5, a mounting bracket 10 may include a bracket face 12 that is adjustable in height by a four-bar linkage 14. A first end of a long bracing bracket 16 may pivotably attach to each side of each end of the bracket face 12. A clevis pin 24, for example, may be used to provide the pivoting attachment between the long bracing bracket 16 and the bracket face 12. A second, opposite end of the long bracing bracket 16 may pivotably attach to a bearing block 18. A shoulder screw 26, for example, may be used to provide the pivoting attachment between the long bracing bracket 16 and the bearing block 18.

A proximal end of a short bracing bracket 20 may pivotably attach to a central section 22 of each of the long bracing brackets 16. Clevis pins 24 may be used to provide the pivoting attachment between the short bracing bracket 20 and the long bracing bracket 16. An opposite distal end of the short bracing bracket 20 may include a plurality of mounting holes 28 and 29.

The mounting hole 29 may be used to pivotably attach the short bracing bracket 20 to a mount 30 with, for example, a short bracing bracket clevis pin 38. The mounting holes 28 may include two mounting holes adapted to receive a pin 32. The mount 30 may include a plurality of holes 36 that align with the mounting holes 28 in the short bracing bracket 20 as the short bracing bracket 20 is pivoted about the short bracing bracket clevis pin 38. The pin 32 may adjust the angle of the short bracing bracket 20 relative to a mounting surface 34, thereby adjusting the height, relative to the mounting surface 34, of the bracket face 12.

The bearing block 18 may be disposed to move along the mounting surface 34 as the height of the bracket face 12 is changed. However, surface irregularities in the mounting surface 34 may hinder movement of the bearing block 18. In some embodiments, the bearing block 18 may have a bearing sleeve 40. Typically, the bearing sleeve 40 may be press fit into a hole in the bearing block 18. First and second clamps 42, 44 may support a bearing travel bar 46 off from the mounting surface 34. The bearing block 18 may travel along the bearing travel bar 46, thereby permitting smooth height adjustment of the bracket face 12.

Referring now to FIGS. 6 through 10, the mounting bracket 10 may be mounted on a panel sub-assembly 50. The pins 32 may be affixed to the panel sub-assembly 50 via a wire 52 connected to a tab 62 secured to the mounting surface 34 by a nut 64, for example, to keep the pins 32 readily available while the height of the bracket face 12 is adjusted.

Figure 10:
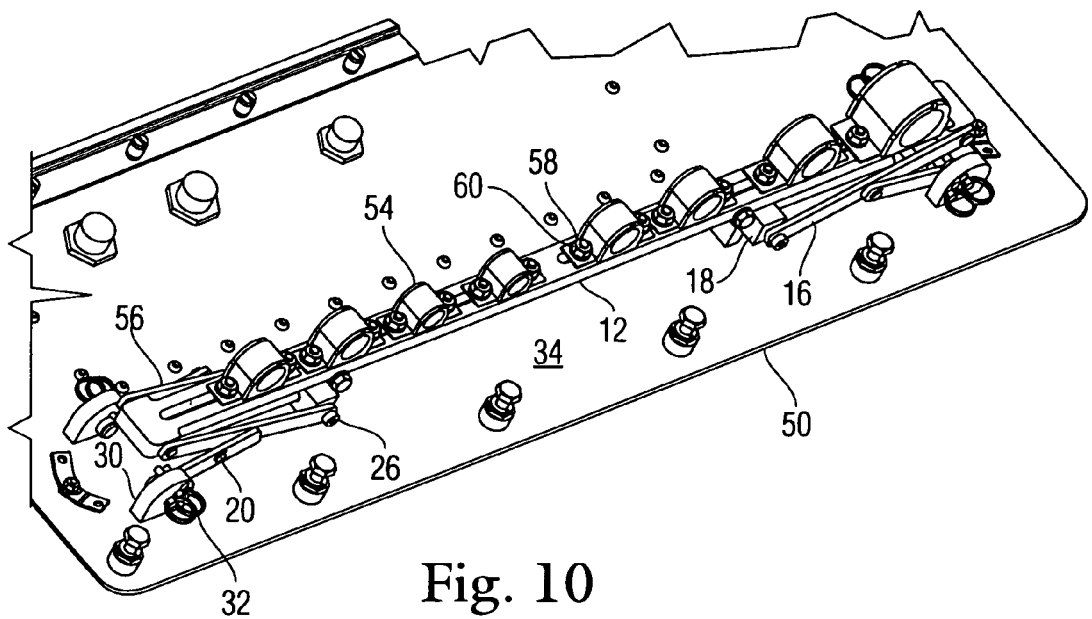
FIG. 10 is a perspective view of the bracket, installed in a panel sub-assembly and holding a plurality of conduit clamps.
Figure 11:
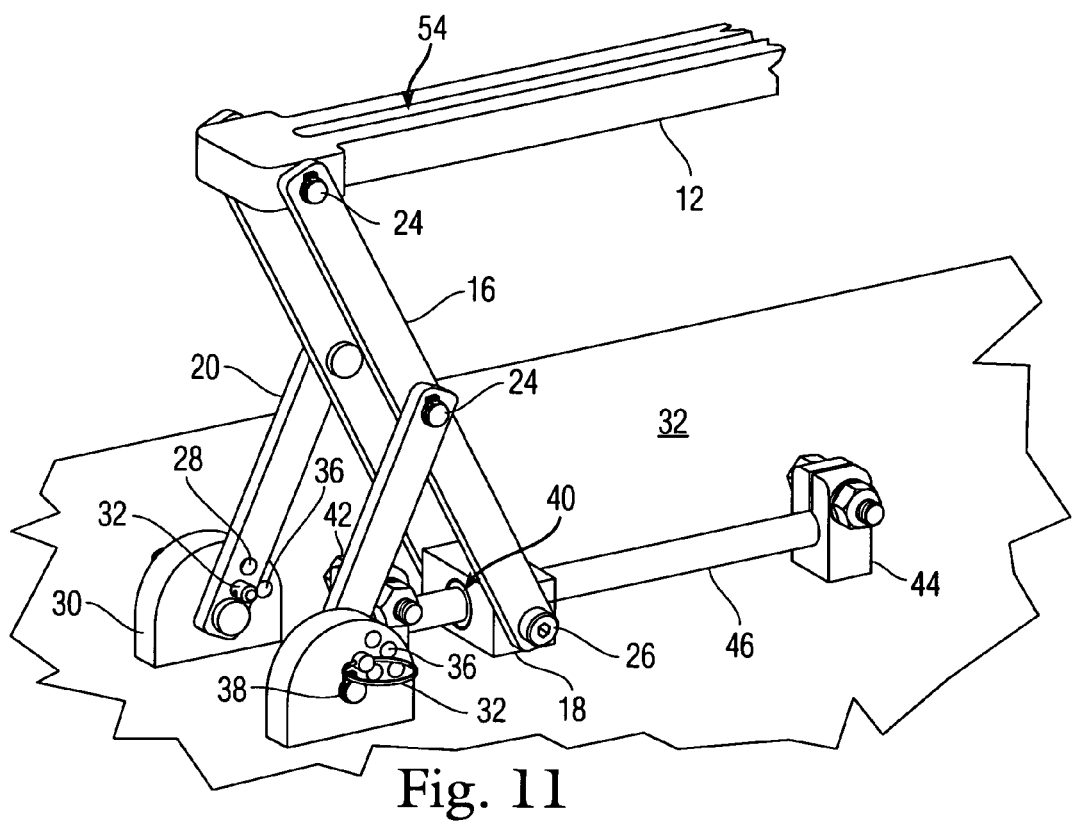
FIG. 11 is a perspective view of the linkage and clamps.
Figure 12:
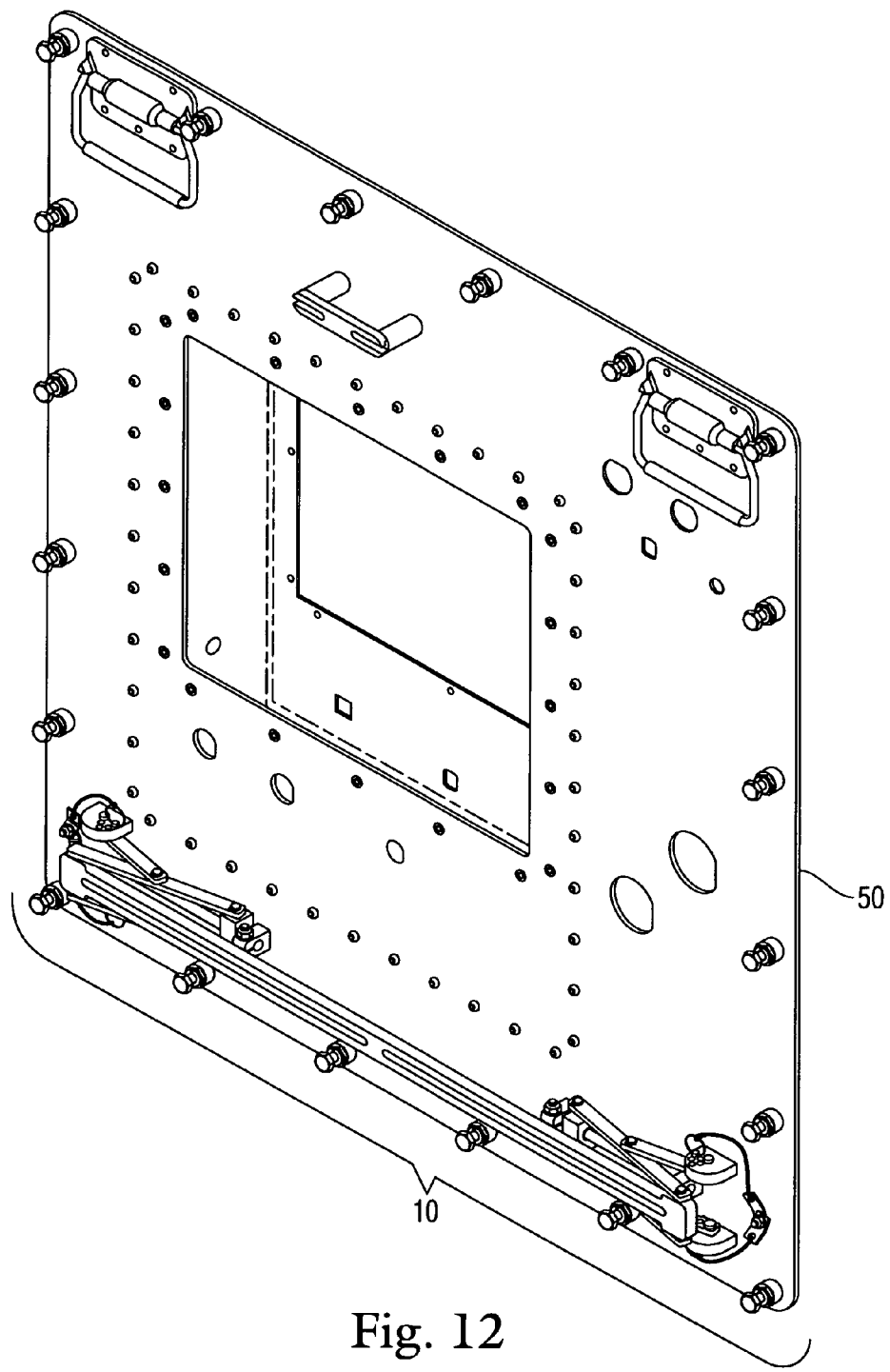
FIG. 12 is a perspective view of the panel sub-assembly.

The bracket face 12 may be adapted to hold a plurality of conduit clamps or pipe clamps 54 as shown in FIG. 10. In some embodiments, the bracket face 12 may have slot 56 cut therein to accept bolts 58 of the conduit or pipe clamps 54. The slot 56 may permit an operator to loosen nuts 60 on the bolts 58 to permit the clamp 54 to slide lengthwise along the slot 56.

While the above describes the bracket 10 having a set of bracing brackets (short bracing bracket 20 and long bracing bracket 16) on each side of the bracket face 12, in some embodiments, a single set of bracing brackets may be used to provide a similar adjustment mechanism as is obtained with two sets of bracing brackets.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An adjustable mounting bracket attachable to a mounting surface, comprising:

a bracket face bar having an adjustable height relative to the mounting surface, said bracket face bar having first and second longitudinal ends, each longitudinal end having parallel lateral terminals;

first and second pairs of bracket anchors disposed on the mounting surface adjacent respective said first and second longitudinal ends, each pair of bracket anchors disposed parallel to each other adjacent to said lateral terminals and having a clevis pin receiver and a plurality of adjustment holes;

first and second pairs of block clamps disposed on the mounting surface between said pairs of bracket anchors;

first and second bearing travel bars disposed between respective said pairs of block clamps;

first and second bearing blocks with respective bearing sleeves that translatable slide along respective said travel bars while adjusting said height of said bracket face bar;

first and second sets of hinge bracing brackets that pivotably connect to respective said lateral terminals at said first longitudinal end, and third and fourth sets of hinge bracing brackets that pivotably connect to respective said lateral terminals at said second longitudinal end, each set of bracing brackets including:

a first bracing bracket having first and second bracket ends, said first bracket end pivotably attached to a corresponding lateral terminal on said bracket face bar, said second bracket end pivotably attached to corresponding said bearing block;

a second bracing bracket having third and fourth bracket ends, said third bracket end pivotably attached to a corresponding mount anchor, said fourth bracket end pivotably attached to said first bracing bracket between said first and second bracket ends, wherein said first bracing bracket is longer than said second bracing bracket;

a primary hole at said third bracket end that pivotably mounts to said clevis pin receiver by a clevis pin; and at least one secondary hole at said third bracket end adjacent said primary hole, said secondary hole adapted to afix said second bracing bracket to one of said adjustment holes to align said a desired angle on said bracket anchor.

2. An adjustable mounting bracket attachable to a mounting surface, comprising:

a bracket face bar having an adjustable height attachable to the mounting surface, said bracket face bar having first and second longitudinal ends, each longitudinal end having parallel lateral terminals;

first and second pairs of bracket anchors disposed on the mounting surface adjacent respective said first and second longitudinal ends, each pair of bracket anchors disposed parallel to each other adjacent to said lateral terminals and having a clevis pin receiver and a plurality of adjustment holes;

first and second pairs of block clamps disposed on the
mounting surface between said pairs of bracket anchors;
first and second bearing travel bars disposed between
respective said pairs of block clamps;
first and second bearing blocks with respective bearing
sleeves that translatably slide along respective said
travel bars while adjusting said height of said bracket
face bar;
first and second sets of hinge bracing brackets that pivotably connect to respective said lateral terminals at said
first longitudinal end, and third and fourth sets of hinge
bracing brackets that pivotably connect to respective
said lateral terminals at said second longitudinal end,
each set of bracing brackets including:
a first bracing bracket having first and second bracket ends,
said first bracket end pivotably attached to a corresponding lateral terminal on said bracket face bar, said second
bracket end pivotably attached to corresponding said
bearing block;
a second bracing bracket having third and fourth bracket
ends, said third bracket end pivotably attached to a corresponding mount anchor, said fourth bracket end pivotably attached to said first bracing bracket between said
first and second bracket ends, wherein said first bracing
bracket is longer than said second bracing bracket;
a primary hole at said third bracket end that pivotably
mounts to said clevis pin receiver by a clevis pin;
at least one secondary hole at said third bracket end adjacent said primary hole;
a pin adapted to fit through said one of said adjustment
holes in the bracket anchor and said secondary hole in
said second bracing bracket end, said pin fixing said
second bracing bracket to a desired angle on said bracket
anchor from the mounting surface, thereby fixing said
height of said bracket face bar; and
a wire connected between said pin and the mounting surface,
wherein the bracket anchors are secured to the mounting
surface and each said second bracing bracket pivotably
connects to said corresponding bracket anchor.

3. The adjustable mounting bracket of claim 1, wherein said mounting face bar has at least one longitudinal slot cut therein.

4. The adjustable mounting bracket of claim 1, further comprising at least one of a pipe clamp and a conduit clamp slidably affixed along said bracket face bar.

5. An adjustable mounting bracket attachable to a mounting surface, comprising:
a bracket face bar having an adjustable height relative to the mounting surface, said bracket face bar having first and second longitudinal ends, each longitudinal end having parallel lateral terminals;
first and second pairs of bracket anchors disposed on the mounting surface adjacent respective said first and second longitudinal ends, each pair of bracket anchors disposed parallel to each other adjacent to said lateral terminals and having a clevis pin receiver and a plurality of adjustment holes;
first and second pairs of block clamps disposed on the mounting surface between said pairs of bracket anchors;
first and second bearing travel bars disposed between respective said pairs of block clamps;
first and second bearing blocks with respective bearing sleeves that translatably slide along respective said travel bars while adjusting said height of said bracket face bar;
first and second sets of hinge bracing brackets that pivotably connect to respective said lateral terminals at said first longitudinal end, and third and fourth sets of hinge bracing brackets that pivotably connect to respective said lateral terminals at said second longitudinal end, each set of bracing brackets including:
a first bracing bracket having first and second bracket ends, said first bracket end pivotably attached to a corresponding lateral terminal on said bracket face bar, said second bracket end pivotably attached to corresponding said bearing block;
a second bracing bracket having third and fourth bracket ends, said third bracket end pivotably attached to a corresponding mount anchor, said fourth bracket end pivotably attached to a central region of said first bracing bracket between said first and second bracket ends, wherein said first bracing bracket is longer than said second bracing bracket;
a primary hole at said third bracket end that pivotably mounts to said clevis pin receiver by a clevis pin; and
at least one hole at said third bracket end adjacent said primary hole, adapted afix said second bracing bracket to a corresponding angle on said bracket anchor,
wherein first and second clamps are adapted to secure travel along said bracket face bar at a predetermined height off the mounting surface, and wherein said bracket face bar has at least one longitudinal slot cut therein.

6. The adjustable mounting bracket of claim 5, wherein said bracket anchors are secured to the mounting surface and each second bracing bracket connects to a corresponding bracket anchor.

7. An adjustable mounting bracket comprising:
a bracket face bar having an adjustable height attachable to the mounting surface, said bracket face bar having first and second longitudinal ends, each longitudinal end having parallel lateral terminals;
first and second pairs of bracket anchors disposed on the mounting surface adjacent respective said first and second longitudinal ends, each pair of bracket anchors disposed parallel to each other adjacent to said lateral terminals and having a clevis pin receiver and a plurality of adjustment holes;
first and second pairs of block clamps disposed on the mounting surface between said pairs of bracket anchors;
first and second bearing travel bars disposed between respective said pairs of block clamps;
first and second bearing blocks with respective bearing sleeves that translatable slide along respective said travel bars while adjusting said height of said bracket face bar;
first and second sets of hinge bracing brackets that pivotably connect to respective said lateral terminals at said first longitudinal end, and third and fourth sets of hinge bracing brackets that pivotably connect to respective said lateral terminals at said second longitudinal end, each set of bracing brackets including:
a first bracing bracket having first and second bracket ends, said first bracket end pivotably attached to a corresponding lateral terminal on said bracket face bar, said second bracket end pivotably attached to corresponding said bearing block;
a second bracing bracket having third and fourth bracket ends, said third bracket end pivotably attached to a corresponding mount anchor, said fourth bracket end pivotably attached to said first bracing bracket between said first and second bracket ends, wherein said first bracing bracket is longer than said second bracing bracket;

a primary hole at said third bracket end that pivotably mounts to said clevis pin receiver by a clevis pin;

at least one secondary hole at said third bracket end adjacent said primary hole; and a pin adapted to fit through one of said adjustment holes in said bracket anchor and said secondary hole in third bracket end, said pin fixing said second bracing bracket to a desired angle on said bracket anchor from the mounting surface, thereby fixing said height of said bracket face bar.

* * * * *